April 27, 1937.  W. F. SPENCER  2,078,641
DOUGHNUT COOKING MACHINE
Filed Feb. 27, 1936  2 Sheets-Sheet 1

INVENTOR
W. F. Spencer
BY Johnston & Jennings
ATTORNEYS

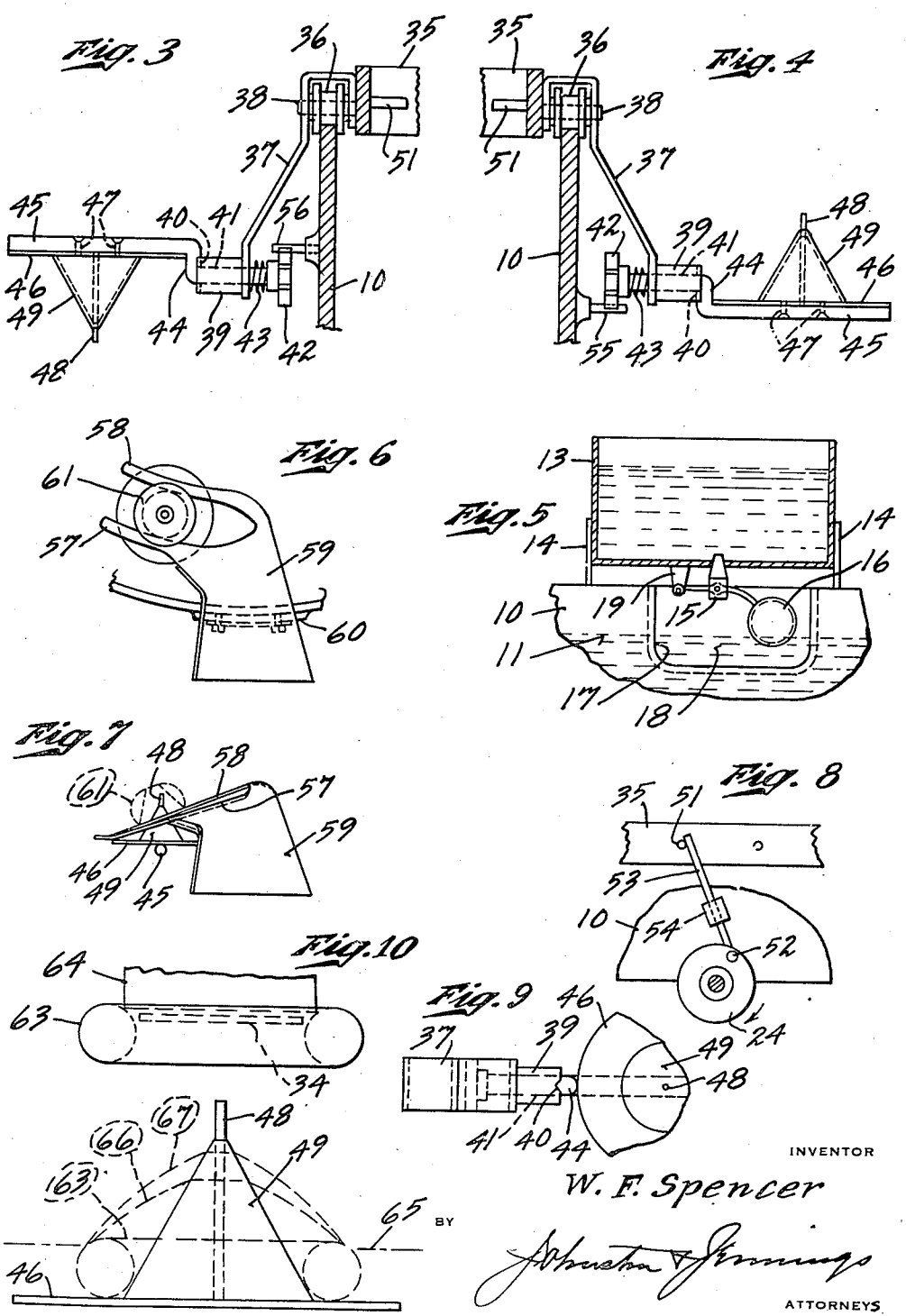

Patented Apr. 27, 1937

2,078,641

UNITED STATES PATENT OFFICE 2,078,641

DOUGHNUT COOKING MACHINE

William F. Spencer, Birmingham, Ala., assignor of one-half to James W. Dunlap, Birmingham, Ala.

Application February 27, 1936, Serial No. 65,957

19 Claims. (Cl. 53—7)

My invention relates to machines especially, though not exclusively, designed and adapted for the cooking of doughnuts and like forms of pastry, the material for forming which is adapted to be measured and dropped into contact with heated liquor in a suitable tank or container provided with means for both moving, turning and ultimately discharging the cooked product.

My invention is characterized by the provision of a traveling carrier for a series of batter receivers which may act to control the shape of the finished doughnut, a term I use generally to apply to the articles to be cooked, such receivers being invertible at appropriate points in their travel to insure the equal cooking of the doughnut throughout.

My invention further contemplates the maintenance of a desired volume of cooking liquor in a heated vessel by the replacement of the liquor as it is consumed by constant small additions of fresh liquor, preferably preheated so as not to disturb substantially the required heat balance of the bath and also preferably introduced by means that will respond automatically to variations in the liquor level in the vessel.

My invention further contemplates the cooking of the doughnut in a relatively shallow annular vessel having means to maintain a fixed level of liquor having predetermined relationship to the plane of the axes about which the receivers turn.

Further, my invention contemplates providing receivers in the form of tapered molds which cause the doughnut when cooked thereon to have a correspondingly shaped interior which adapts it to receive a filling so as to form a novel confection.

A further object of my invention is to cook the interior surface of the doughnut against a heated metallic element which will give it a close texture throughout its inner wall which will render the doughnut at that point practically impervious to prevent the objectionable access of grease to the porous interior of the cooking doughnut.

My invention further comprises simple and effective means to advance the receivers with a step by step motion, which presents them successively in batter receiving position; means for utilizing the motion of the receivers to invert and restore them at the appropriate points in their travel; a simple and effective means for lifting cooked doughnuts from the receivers, draining off their liquor, and discharging them dry and crisp from the machine; a liquor reservoir exposed to the heat of the cooking vessel and responsive to exhaustion of liquor in the cooking vessel for maintaining the liquor level therein; and means for mounting on the receivers molds adapted for ready interchange according to the design desired for the cooked article.

My invention further comprises the novel details of construction and arrangements of parts hereinafter more particularly described and claimed, reference being had to the accompanying drawings which form a part of this specification, and in which:—

Figs. 3 and 4 are detail views showing a receiver in side elevation engaging the means to invert and reset it in each of its work cycles.

Fig. 5 is a detail view showing the liquor supply reservoir and its float control in the cooking vessel.

Figs. 6 and 7 are views in plan and side elevation of the means for stripping the cooked article from the mold receiver and discharging it automatically.

Fig. 8 is a detail view illustrating the intermittent feed for the carrier ring for the receivers.

Fig. 9 is a detail plan view showing the spring latch which holds the carriers in upright or inverted positions.

Fig. 10 is an enlarged detail view in cross section showing the feed mechanism for producing a ring of doughnut stock and showing this ring dropped into its initial relationship to the mold with the dotted lines showing the manner in which the doughnut stock expands to take the desired shape while cooking.

Similar reference numerals refer to similar parts throughout the drawings.

Figures 1, 2:
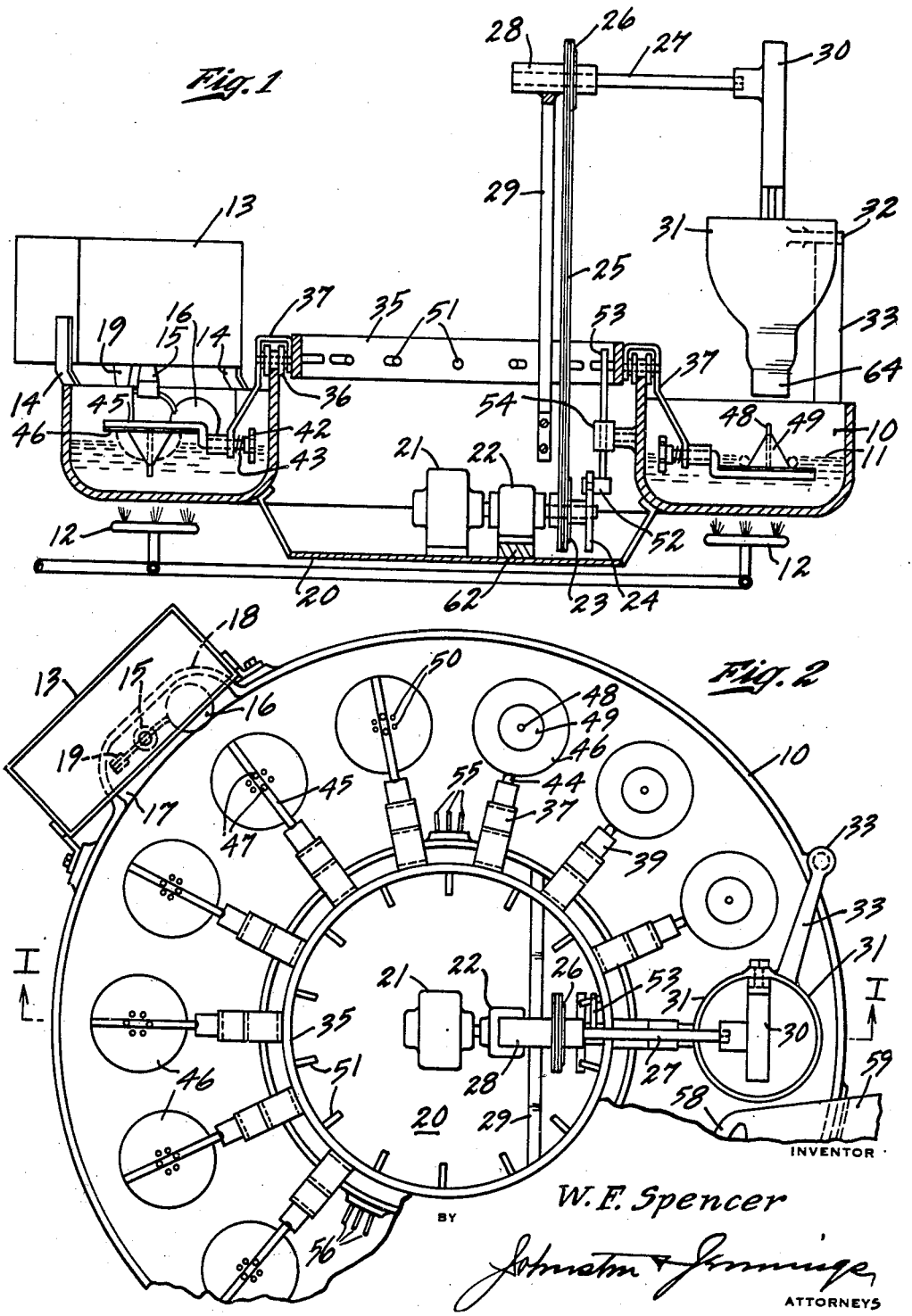
Fig. 1 is a transverse vertical sectional view taken on the line I—I of Fig. 2.
Fig. 2 is a fragmental plan view of Fig. 1.

In the embodiment of my invention illustrated, I show a relatively shallow annular cooking pan 10 containing fat, grease, or any suitable cooking liquor 11 in which the doughnuts will be cooked, and which is heated by the burners 12 arranged at intervals around under the pan or in any other desired manner. I mount on the pan, at any suitable position, a reservoir 13 for the liquor having suitable supporting brackets 14 and a bottom aperture closed by a plug 15, which plug is pivotally connected to the rod of a float 16 that rides on the liquor in the pan. The pan's outer wall is cut away at 17 to give access for the liquor to an extension 18 which underlies the valve plug 15. The float rod is pivoted to a bracket 19 under the reservoir and it acts in the manner well understood to maintain the liquor 11 at a substantially constant level in the pan 10 by constant small replacements of heated liquor which will not disturb the heat balance in the pan.

A center plate 20 is suitably attached to the inner wall of the pan 10 and supports a motor 21 which, through a suitable speed reducing gearing 22, drives a pulley 23 and a crank disk 24. This pulley, by means of belting 25, drives a pulley 26 fast on a top horizontal shaft 27 that is journalled in a bearing 28 supported by a vertical arm 29 secured to the inner wall of the pan. The shaft 27 loosely interfits in a socket in the upper end of the housing 30 for the drive for the mechanism for feeding the doughnut material or batter to the cooking pan, which mechanism comprises a container 31 having a bottom delivery spout 64 and suitable mechanism, not shown, for agitating and expelling the material in ring form so that it will fall into the cooking pan. The vessel 31 is mounted on a swinging arm 32 suitably pivoted to a bracket 33 carried by the outer wall of the pan and its housing 30 is free to swing away from, and back into engagement with, the drive shaft 27. This mechanism for feeding the material or batter to the cooking pan may be of any standard construction and therefore forms no particular part of this invention, for which reason it is unnecessary that it be described in detail further than to say that in feeding out the material a disk plunger, such as 34 in Fig. 10, is lowered to permit a ring of batter or doughnut stock to be expelled through the annular opening thus provided and to be cut off when the plunger is retracted.

The cooking mechanism comprises a carrier ring 35 of less diameter than the inner wall of the pan 10 and adapted to be mounted for rotation on the upper edge of said wall by means of a series of grooved rollers 36, each journalled in the inverted U-shaped upper end of a hanger bracket 37. Each roller is mounted on a stud bearing pin 38 which serves to fixedly attach its respective bracket to the ring 35. Each bracket has fast on its inner end a bearing sleeve 39, the free end of which is provided with upper and lower diametrically opposed notches 40, as seen more clearly in Fig. 9.

In each bearing 39 I mount free to slide and rotate a shaft or rod 41, the inner end of which carries a sprocket gear or toothed wheel 42 fast thereon with a coiled spring 43 interposed between the gear hub and the lower end of the bracket 37. Each shaft 41 has a right angled bend at 44 which is shaped so as to engage, like a latch, in one or other of the notches 40, as a detent. The right angled portion 44 is short and beyond it the shaft continues horizontally at 45 on which as a support an annular disk or thin metal plate 46 is secured by one or more screws 47 and is disposed in horizontal position. The disk is preferably circular and has a central aperture into which a vertical pin 48 is inserted and made fast. The pin is associated with a tapered mold surface designed to be engaged by the center of the cooking doughnut to seal its wall there and give its center the desired shape. As shown this mold surface is provided by a conical hollow mold 49 secured to the disk with the pin 48 projecting through its apex. Suitable vent apertures 50 are provided in the disk 46 under the mold.

The pin, mold and its carrier mechanism thus described, is common to each of the brackets 37 and these constitute batter receivers which are spaced as closely together as is practical around the entire pan. Any suitable number may be used, dependent of course on the diameter of the cooking pan.

The ring 35 carries a series of inwardly projecting pins 51 which are equi-distantly spaced and adapted to be successively engaged by the propelling mechanism shown in Fig. 8 and comprising the crank disk 24 having a crank pin 52 to which is pivotally connected a feed arm 53 adapted both to slide through and rock with a swivel pin 54 mounted in a bearing on the inner wall of the pan 10. This feed arm, as it is rocked by the crank 24, will successively engage the pins 51 and advance the carrier ring and batter receivers step by step around the pan.

The inner wall of the pan carries two sets of trip pins 55 and 56, which are disposed at different levels if the batter receivers are to be inverted by back and forth pivotal movements, the lower pins 55 being placed a suitable distance from the batter receiving position of the receivers to permit the initial cooking of the doughnut to take place sufficiently to seal its under side and give it a full swell or expansion before its respective mold and carrier engages these pins. When this occurs, the pins by successive engagement with the teeth on the toothed wheel or sprocket gear 42, will act to invert the carrier, forcing its latch element 42 to ride out of the upper detent 40 and, after making a half turn, to engage in the lower detent 40.

The upper set of pins 56 are positioned where the inverted doughnut will have been properly cooked on its under side before the carrier sprocket or gear 42 will engage them, and they will again unlatch and rotate the mold a half revolution when its latch 44 will again engage the upper detent 40, which resets the receiver in position for the doughnut to be engaged and lifted therefrom by the downwardly inclined bifurcations 57 and 58 which lead upwardly at an incline to and join a discharge chute 59, the bifurcation 58 rising substantially above the bifurcation 57 at its point of junction with the discharge chute which is above the level of the mold 49 and pin 48 so that the latter can pass under the chute while the released doughnut will slide down the chute outwardly beyond the pan. The chute is suitably mounted by brackets 60 on the outer wall of the pan so as to overhang the pan. In Fig. 7 a cooked doughnut 61 is shown being pushed up the bifurcations 57 and 58 by its receiver pin 48 preparatory to being laterally discharged along the chute 59.

If desired, the plate 20 can be reinforced by the cross bar 62 to more firmly and rigidly support the drive element 22.

The mold elements of the receivers comprising the disks 46 and cones 49, can be readily removed and interchanged so as to modify the form of the cooked article, which I have generally referred to herein as a doughnut and which preferably has a composition and texture similar to doughnuts so that it will cook with a close, crisp exterior texture and a relatively light porous interior. The shape of the cooked article, where the mold 49 is used on the carrier, will be better understood by reference to Fig. 10, where the plunger 34 is shown lowered and a ring of batter 63 is in the act of being extruded from the spout 64 of the container 31. A receiver is shown with its pin and mold in concentric position immediately under the spout 64 and the dotted lines 63 indicate the batter ring as it comes to rest on cone 49 with its top substantially at the level of the liquor 11, indicated by the dotted line 65. As the article cooks the ring expands and assumes approximately the shape indicated by the dotted line 66 by the time its carrier has reached the pins 55. These pins invert the mold and thereupon the cooking proceeds, the final shape of the cooked article being indicated by the dotted line 67, the cooking being completed by the time the article reaches the pins 56. These latter pins restore the mold to upright position and the cooking of the under part of the doughnut continues, it being noted that the total travel of the doughnut in upright position is approximately equal to its travel in inverted position.

The level of the liquor should be substantially in the same plane with the axis of the receiver bearings 39. As the cooked article is pushed upwordly along the incline to discharge position on the chute 59, it has ample time to drain and to be rendered dry and crisp by the action of the heat above the hot bath of liquor. I thus avoid all of the disadvantages of quickly flipping the cooked article from the pan with more or less grease and eliminate a very considerable waste of the grease. The crank motion of the disk 46, during the upright position of the receiver, lowers it below the liquor level and during the inverted cooking interval raises it a like distance above the liquor level. The finished article will readily free itself from the cone due to the latter being tapered and well greased and to the buoyant effect of the liquor which will lift it so that the lifting elements 57 and 58 will readily pass under it without marring it.

The cooked article will have a smooth close texture on its inner surface which has the shape of a truncated cone, this shape, however, being subject to variation according to the character of the confection to be produced and the nature of the filling, if any, to be inserted. In this respect the article differs materially from the usually mechanically cooked doughnut, the aperture of which is substantially closed in the cooking operation.

When it is desired to cook the ordinary doughnut, the molds 49 are removed entirely, leaving only the pins 48 which serve as receivers for both advancing the doughnut as it cooks, turning it over and back as it cooks, and for presenting it to any suitable discharge mechanism. It will be noted that the drive for the carrier mechanism acts intermittently and leaves each receiver at rest during the interval while the batter ring is being dropped into position thereon.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. A doughnut cooking machine, comprising a cooking vessel adapted to contain heated liquor, means to drop charges of batter into said liquor, an intermittently movable carrier comprising invertibly mounted elements adapted successively to receive the batter charges, and mechanism to invert said elements to turn the article in the liquor as it cooks.

2. A doughnut cooking machine according to claim 1, in which each element comprises a mold disposed substantially concentric with the batter charge when in receiving position.

3. A doughnut cooking machine, comprising a cooking vessel adapted to contain heated liquor, means to discharge batter rings thereinto, an intermittently movable carrier comprising rotatably mounted elements adapted successively to receive a batter ring, mechanism to invert said elements about a horizontal axis to turn the cooking article, and means to strip from said elements the cooked articles and discharge them.

4. A cooking mechanism comprising an annular cooking vessel adapted to contain heated liquor, a rotatable carrier, a series of batter receivers invertibly mounted on said carrier, means to advance the carrier, means to drop a batter ring successively over each receiver, means to invert said receivers when the article thereon is partially cooked, and means to restore the receivers to initial position when the article thereon is substantially cooked.

5. A cooking mechanism comprising a cooking vessel adapted to contain heated liquor, a movable carrier having a series of batter receivers, means to advance the carrier, means to drop batter successively onto said receivers and into said liquor, means to invert said receivers to turn over the article thereon when partially cooked and again when cooked, and means to effect the discharge of the cooked articles from the cooking vessel.

6. A cooking mechanism comprising an annular cooking vessel adapted to contain heated liquor, a rotatable carrier having a series of batter receivers, means to advance the carrier, means to drop batter onto each receiver and into said liquor, means to invert said receivers to turn the article thereon when partially cooked, means to restore the receivers to initial position when the article thereon is substantially cooked, and means to effect the discharge of the cooked articles from the cooking vessel.

7. In combination, a cooking vessel containing hot liquor, means tending to maintain said liquor at a predetermined level, receivers invertibly mounted and movable through the liquor in predetermined relation to said level, means to supply batter to said receivers, means to invert the receivers, and means to restore the receivers to initial position.

8. A cooking mechanism as described in claim 7, in which the receivers carry molds about which the article is adapted to cook.

9. A cooking mechanism as described in claim 5, in which the receivers carry demountable and interchangeable molds to form the article being cooked.

10. In a cooking mechanism of the character described, a vessel containing heated liquor, a sequence of invertibly mounted receivers and means to advance them, means to deposit a charge of material to be cooked upon the receivers successively, and means to invert and then restore the receivers to initial position without disengaging them from the cooking article.

11. A cooking mechanism according to claim 10, in which the receivers carry an upright pin to receive the charge of batter and adapted to retain engagement therewith during the inversion and restoration of the carrier to initial position.

12. A cooking mechanism according to claim 10, in combination with latch means adapted to hold each receiver set in its several operating positions.

13. A cooking mechanism according to claim 5, in which the means for inverting and restoring a carrier to upright position comprises a journal for the carrier, a toothed element fast on said journal, and pins fast on the vessel in position to engage and turn the toothed element a half revolution for each turning operation.

14. In a cooking mechanism of the character described, the combination with a vessel containing liquor adapted to be heated, a storage reservoir for said liquor, means responsive to the liquor level in said vessel to drain liquor from said reservoir and introduce it into said vessel to maintain its liquor level substantially constant, rotatably mounted batter receivers movable at a predetermined level with relation to said liquor level, and means to rotate said receivers to change the position in the liquid of an article being cooked therein.

15. A cooking mechanism according to claim 14, in which the rotatable receivers are mounted on cranks having their axes disposed horizontal and adjacent to said normal liquor level in the cooking vessel.

16. A cooking mechanism according to claim 14, in which the receivers are mounted on a crank having its journal substantially at the normal liquor level in the cooking tank, in combination with a latch element adapted to coact with the crank, and spring means to hold the crank and latch element engaged in the upright and inverted positions in said receivers.

17. A cooking mechanism of the character described, comprising a shallow annular pan adapted to contain liquor and be heated, a carrier ring rotatable on said vessel as a track, mechanism to advance the ring, brackets carried by the ring and having journalled therein receivers for the article to be cooked, means to invert and restore the receivers, latch means to hold the receivers in inverted and restored positions, means to drop batter to be cooked successively on said receivers, and means to effect the ejection of a cooked article after it has drained from the cooking vessel.

18. A cooking mechanism of the character described, comprising a shallow annular pan, means adapted to drop batter rings into hot liquor in the pan, means to maintain a predetermined level of said liquor in said pan; means to heat the liquor; a carrier ring comprising a plurality of brackets; each bracket carrying a grooved roller adapted to ride on the inner edge of the pan, a bearing carried at the lower bracket end near the liquor level in the pan, a crank shaft journalled in said bearing, a batter receiving element mounted on one end of the shaft, notches in said bearing in which the crank portion of the shaft engages, a toothed wheel on the other crank end and a spring to hold the crank in engagement with a bearing notch, two sets of pins at different positions in the path of said wheel mounted fixedly and each adapted to engage the toothed wheel and rotate the crank a half turn, a vertical pin on each receiver adapted to receive the batter ring and to turn it over and back in its traverse of the pan, and means to effect the discharge of the finished article after allowing time for it to drain and dry before being discharged.

19. A cooking mechanism comprising a cooking vessel adapted to contain heated frying liquor, a carrier moving in a circuit about said vessel, a plurality of batter receivers movable with the carrier and adapted to be inverted, means to drop a batch of batter over each passing receiver, means to invert the receivers to turn the article over in said liquor when it is partially cooked, and means to again invert the receivers when the article they propel is substantially cooked.

WILLIAM F. SPENCER.